(12) United States Patent
Apgar et al.

(10) Patent No.: US 8,438,702 B2
(45) Date of Patent: May 14, 2013

(54) FLEXIBLE HINGE FOR ELECTRONIC DEVICES

(75) Inventors: Jeffrey Allen Apgar, Escondido, CA (US); Karthikeyan Govindhasamy, San Diego, CA (US); Shan Feng Chang, Taoyan (TW); John Hwang, La Verne, CA (US)

(73) Assignee: Nokia Corporation, Espoo (FI)

( * ) Notice: Subject to any disclaimer, the term of this patent is extended or adjusted under 35 U.S.C. 154(b) by 25 days.

(21) Appl. No.: 12/985,991

(22) Filed: Jan. 6, 2011

(65) Prior Publication Data
US 2012/0176736 A1    Jul. 12, 2012

(51) Int. Cl.
    *E05D 1/00*        (2006.01)
(52) U.S. Cl.
    USPC .............................................. 16/225; 16/387
(58) Field of Classification Search ............... 16/225, 16/DIG. 13, 385; 428/172, 217, 58, 60, 61, 428/62, 323, 325, 53, 54
    See application file for complete search history.

(56) References Cited

U.S. PATENT DOCUMENTS

| | | | | |
|---|---|---|---|---|
| 4,809,402 A | * | 3/1989 | Rainville | 16/372 |
| 4,885,820 A | * | 12/1989 | Erceg et al. | 16/225 |
| 4,933,231 A | * | 6/1990 | Seber | 442/148 |
| 5,105,594 A | | 4/1992 | Kirchner | |
| 5,463,794 A | * | 11/1995 | Erland | 16/225 |
| 5,541,813 A | * | 7/1996 | Satoh et al. | 361/752 |
| 5,975,563 A | * | 11/1999 | Gallagher et al. | 280/728.3 |
| 6,175,989 B1 | * | 1/2001 | Carpenter et al. | 16/225 |
| 6,719,354 B2 | * | 4/2004 | Holt | 296/146.11 |
| 6,757,160 B2 | | 6/2004 | Moore et al. | |
| 2004/0266502 A1 | * | 12/2004 | Holtorf et al. | 455/899 |
| 2006/0240235 A1 | * | 10/2006 | Boutghrit et al. | 428/292.1 |
| 2007/0000091 A1 | * | 1/2007 | Priegelmeir et al. | 16/372 |
| 2008/0030942 A1 | | 2/2008 | Elizalde | |
| 2009/0183339 A1 | | 7/2009 | Duan et al. | |

FOREIGN PATENT DOCUMENTS

| | | |
|---|---|---|
| CN | 2839507 Y | 11/2006 |
| EP | 1178647 A2 | 2/2002 |
| WO | 2006065645 A2 | 6/2006 |

* cited by examiner

*Primary Examiner* — Chuck Y. Mah
(74) *Attorney, Agent, or Firm* — Harrington & Smith

(57) ABSTRACT

In accordance with an example embodiment of the present invention, an apparatus comprises a flexible hinge comprising first and second layers; the first layer comprising an elastomer and the second layer comprising a composite fabric.

16 Claims, 4 Drawing Sheets

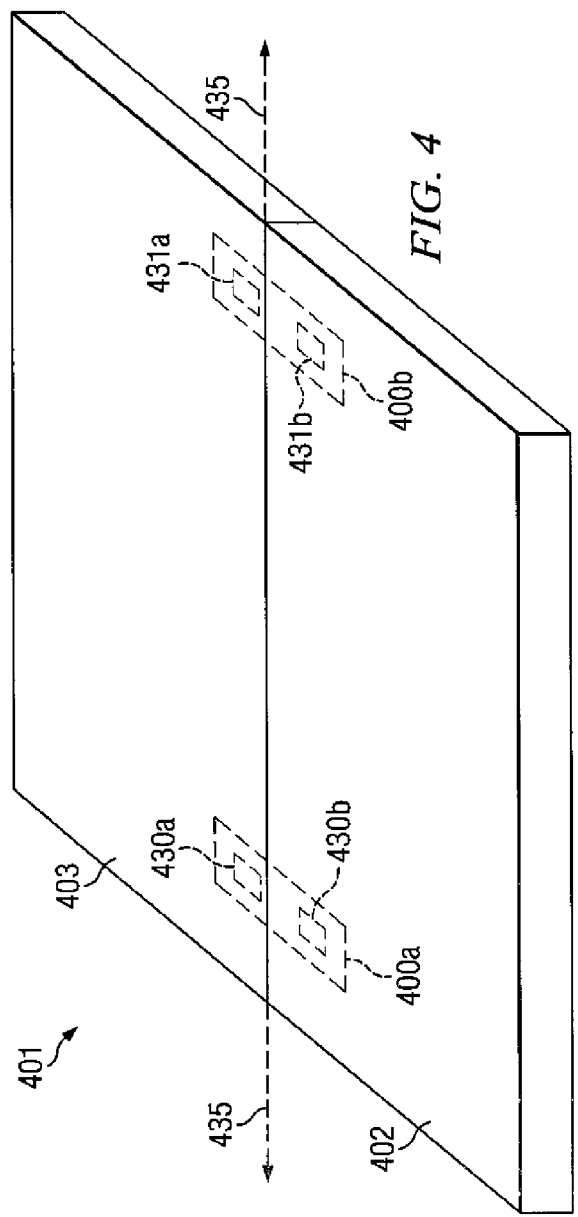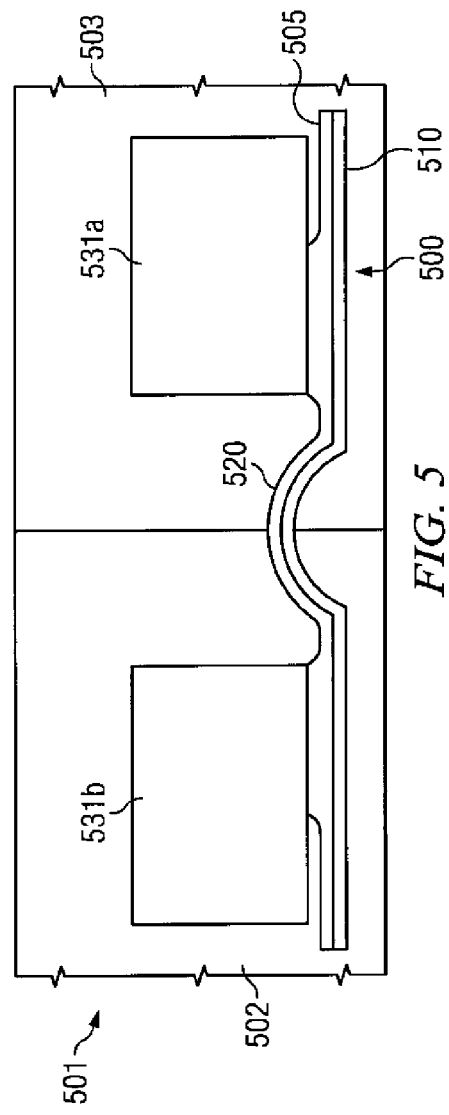

US 8,438,702 B2

FLEXIBLE HINGE FOR ELECTRONIC DEVICES

TECHNICAL FIELD

The present application relates generally to a method and apparatus for a hinge.

BACKGROUND

Electronic devices such as a laptop computer, a personal digital assistant (PDA) or a mobile phone may generally comprise two portions, a top housing and bottom housing, which are coupled with one or more hinges. One or more conventional hinges may be used to rotatably couple the top and bottom housings of the electronic device. Electronic devices with top and bottom housings coupled by one or more conventional hinges may have a closed configuration and an open configuration.

SUMMARY

Various aspects of examples of the invention are set out in the claims.

According to a first aspect of the present invention, an apparatus comprises a flexible hinge comprising first and second layers, the first layer comprises an elastomer and the second layer comprises a composite fabric.

According to a second aspect of the present invention, an electronic device comprises at least one flexible hinge comprising first and second layers, the first layer comprises an elastomer and the second layer comprises a composite fabric; and at least one hinge bracket coupled with the hinge and a body portion of the electronic device.

According to a third aspect of the present invention, a method comprises coupling a first layer material with a second layer material forming a flexible hinge, the first layer comprising an elastomer and the second layer comprising a composite fabric.

BRIEF DESCRIPTION OF THE DRAWINGS

For a more complete understanding of example embodiments of the present invention, reference is now made to the following descriptions taken in connection with the accompanying drawings in which:

FIG. 4 is a diagram of an electronic device comprising hinges in an open configuration according to an example embodiment of the invention;

FIG. 5 is a diagram of a sectional side view of an electronic device comprising a hinge in an open configuration according to an example embodiment of the invention;

DETAILED DESCRIPTION OF THE DRAWINGS

An example embodiment of the present invention and its potential advantages are understood by referring to FIGS. 1 through 7 of the drawings.

Figure 1:
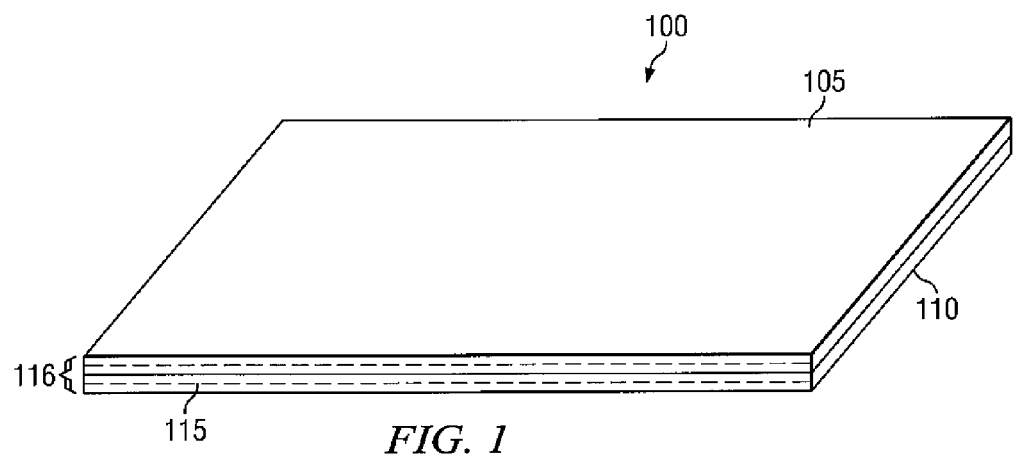
FIG. 1 is a diagram of an apparatus in a flat configuration comprising layers according to an example embodiment of the invention.

FIG. 1 is a diagram of an apparatus 100 in a flat configuration comprising layers 105 and 110 according to an example embodiment of the invention. In an embodiment, an apparatus such as apparatus 100 comprises a flexible hinge. In an embodiment, the hinge is at least one of non-metallic and non-conducting. Further, in an embodiment, the apparatus comprises first and second layers 105 and 110, the first layer 105 comprising an elastomer and the second layer 110 comprising a composite fabric. In an embodiment such as FIG. 1, the apparatus is flat. In an embodiment, such as FIG. 2, the apparatus is at least one of curved and shaped. However, the apparatus may be curved and/or shaped in any way appropriate for a particular hinge application.

In an embodiment, the first layer 105 comprises an elastomer. In an embodiment, an elastomer is any rubbery material such as but not limited to thermoplastics, thermosets, natural rubber, synthetic rubber such as butyl rubber or neoprene and/or the like. In an embodiment, an elastomer is composed of long, chainlike molecules that are capable of recovering their original shape after being stretched. In the embodiment, under normal conditions, the long molecules making up an elastomer material are irregularly coiled. With the application of force, however, the molecules straighten out in the direction in which they are pulled. Upon release, the molecules spontaneously return to their normal compact, random arrangement.

In an embodiment, the first layer 105 comprises a thermoplastic material. In an embodiment, a thermoplastic material is a synthetic plastic or resin capable of softening or fusing when heated and of hardening again when cooled without appreciable change of inherent properties. First layer 105 may comprise any thermoplastic material such as but not limited to polyethylene, polystyrene and/or the like.

In an embodiment, the first layer 105 comprises a thermoset material. In an embodiment, a thermoset or thermosetting material is a polymer-based liquid or powder that becomes permanently solid when heated or cured, placed under pressure, treated with a chemical and/or when treated with radiation. In an embodiment, the curing process creates a chemical that, unlike thermoplastic, prevents the material from being remelted.

In an embodiment, the first layer 105 comprises natural rubber. In an embodiment, natural rubber is a highly elastic solid substance polymerized by the drying and coagulation of the latex or milky juice of rubber trees and plants. Further, in an embodiment, natural rubber does not conduct electricity, readily absorbs mechanical shock and is resistant to moisture.

In an embodiment, the first layer 105 comprises synthetic rubber. In an embodiment, synthetic rubber includes any of several substances similar to natural rubber in properties and uses. Further, in an embodiment, synthetic rubber is produced by the polymerization of an unsaturated hydrocarbon such as butylenes or isoprene. Further, synthetic rubber may be produced by the copolymerization of such hydrocarbons with styrene, butadiene, and/or the like.

In an embodiment, the second layer 110 comprises a composite fabric. In an embodiment, a composite fabric is an engineered fabric made from at least one component such as but not limited to Kevlar®, Cordura®, fiberglass, carbon fiber and/or the like. In an embodiment, the at least one component is a strong fiber which gives the material tensile strength. In an embodiment, the at least one component comprises a resin, such as polyester or epoxy that binds the fibers together.

In an embodiment, the second layer 110 comprises Kevlar®. In an embodiment, Kevlar® is a lightweight, synthetic fiber available from DuPont® comprising long-chain polyamides and having high tensile strength and temperate resistance.

In an embodiment, the second layer 110 comprises a Cordura® fabric available from Invista™ SARL of Wichita, Kans. USA.

In an embodiment, apparatus 100 comprises an electrical coupler. In an embodiment, an electrical coupler such as electrical coupler 115 includes, but is not limited to a flexible printed circuit (FPC), micro coaxial cable, wire and/or the like, which is capable of carrying electrical signals and/or power from one end of the apparatus 100 to another end. In an embodiment, the electrical coupler is disposed between first and second layers 105 and 110. In another embodiment, the electrical coupler is disposed on or within at least one of the first and second layers 105 and 110.

The thickness 116 of the apparatus 100 and the thickness of layers 105 and 110 may be any size appropriate for the apparatus application. Smaller, lightweight applications of apparatus 100 may require less thickness 116 than larger hinge applications.

In an embodiment, apparatus 100 is a hinge.

Figure 2:
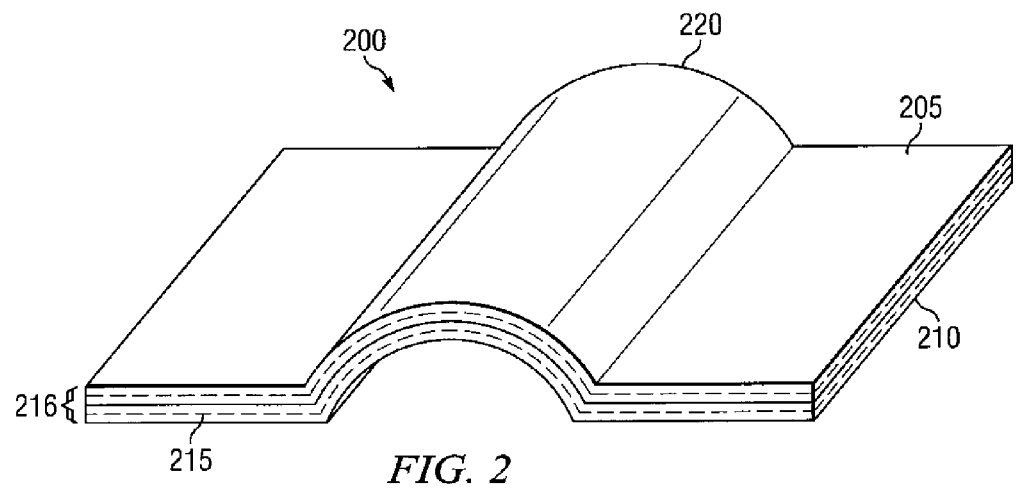
FIG. 2 is a diagram of an apparatus in a curved configuration comprising layers according to an example embodiment of the invention.

FIG. 2 is a diagram of an apparatus 200 in a curved configuration comprising layers 205 and 210 according to an example embodiment of the invention. In an embodiment, an apparatus such as apparatus 200 comprises a flexible hinge. In an embodiment, the hinge is at least one of non-metallic and non-conducting. Further, in an embodiment, the apparatus comprises first and second layers 205 and 210, the first layer 205 comprising an elastomer and the second layer 210 comprising a composite fabric.

In an embodiment, the apparatus is at least one of curved and shaped. In FIG. 2, apparatus 200 comprises shaped portion 220. In an embodiment such as FIG. 1, the apparatus is flat. However, the apparatus may be curved and/or shaped in any way appropriate for a particular hinge application.

In an embodiment, the first layer 205 comprises an elastomer. In an embodiment, the first layer 205 comprises a thermoplastic material. In an embodiment, the first layer 205 comprises a thermoset material. In an embodiment, the first layer 205 comprises natural rubber. In an embodiment, the first layer 205 comprises synthetic rubber.

In an embodiment, the second layer 210 comprises a composite fabric. In an embodiment, the second layer 210 comprises Kevlar®. In an embodiment, the second layer 210 comprises a Cordura® fabric.

In an embodiment, apparatus 200 comprises an electrical coupler. In an embodiment, an electrical coupler such as electrical coupler 215 includes, but is not limited to a flexible printed circuit (FPC), micro coaxial cable, wire and/or the like, which is capable of carrying electrical signals and/or power from one end of the apparatus 200 to another end. In an embodiment, the electrical coupler is disposed between first and second layers 205 and 210. In another embodiment, the electrical coupler is disposed on or within at least one of the first and second layers 205 and 210.

The thickness 216 of the apparatus 200 and the thickness of layers 205 and 210 may be any size appropriate for the hinge application. Smaller, lightweight applications of apparatus 200 may require less thickness 216 than larger apparatus applications.

In an embodiment, apparatus 200 is a hinge for an electronic device.

Figure 3:
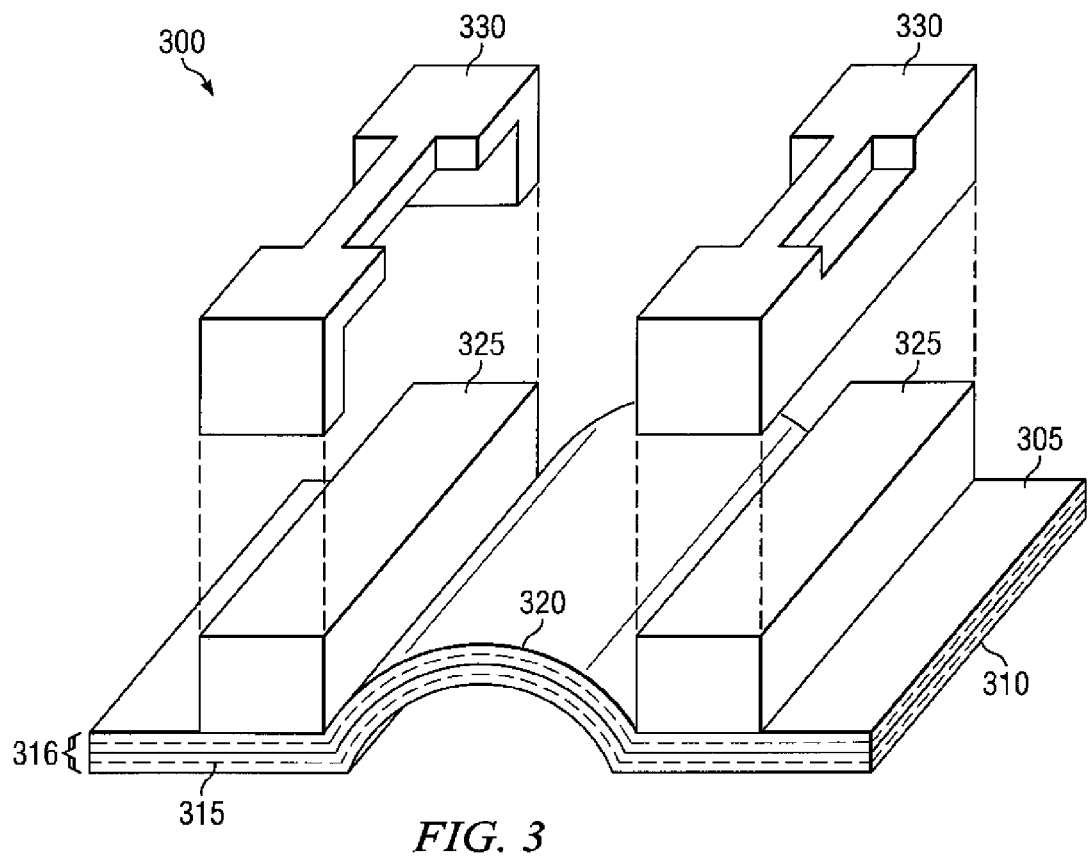
FIG. 3 is a diagram of an apparatus in a curved configuration having bracket interface portions and brackets according to an example embodiment of the invention.

FIG. 3 is a diagram of an apparatus 300 in a curved configuration comprising layers 305 and 310 according to an example embodiment of the invention. In an embodiment, an apparatus such as apparatus 300 comprises a flexible hinge. In an embodiment, the hinge is at least one of non-metallic and non-conducting. Further, in an embodiment, the apparatus 300 comprises first and second layers 305 and 310, the first layer 305 comprising an elastomer and the second layer 310 comprising a composite fabric.

In an embodiment, the apparatus comprises at least one of a flat, curved and shaped portion. In FIG. 3, apparatus 300 comprises shaped portion 320. In an embodiment such as FIG. 1, the apparatus is flat. However, the apparatus may be curved such as in FIG. 3 and/or shaped in any way appropriate for a particular hinge application.

In an embodiment, the first layer 305 comprises an elastomer. In an embodiment, the first layer 305 comprises a thermoplastic material. In an embodiment, the first layer 305 comprises a thermoset material. In an embodiment, the first layer 305 comprises natural rubber. In an embodiment, the first layer 305 comprises synthetic rubber.

In an embodiment, the second layer 310 comprises a composite fabric. In an embodiment, the second layer 310 comprises Kevlar®. In an embodiment, the second layer 310 comprises Cordura™ fabric.

In an embodiment, apparatus 300 comprises an electrical coupler. In an embodiment, an electrical coupler such as electrical coupler 315 includes, but is not limited to a flexible printed circuit (FPC), micro coaxial cable, wire and/or the like, which is capable of carrying electrical signals and/or power from one end of the apparatus 300 to another end. In an embodiment, the electrical coupler is disposed between first and second layers 305 and 310. In another embodiment, the electrical coupler is disposed on or within at least one of the first and second layers 305 and 310.

The thickness 316 of the apparatus 300 and the thickness of layers 305 and 310 may be any size appropriate for the hinge application. Smaller, lightweight applications of apparatus 300 may require less thickness 316 than larger hinge applications.

In an embodiment, apparatus 300 comprises at least one bracket interface portion such as bracket interface portions 325. In an embodiment, bracket interface portions 325 comprise any material including but not limited to an elastomer and/or the like. In an embodiment, bracket interface portions 325 comprise the same material as layer 305 of apparatus 300. In an embodiment, bracket interface portions 325 and layer 305 are a single molded part.

In an embodiment, apparatus 300 further comprises at least one hinge bracket such as hinge brackets 330. In an embodiment, the at least one hinge bracket is coupled with the at least one bracket interface portion 325 as shown in FIG. 3. A hinge bracket may be coupled with a bracket interface portion in any manner including but not limited to a fastener, epoxy and/or the like.

In an embodiment, apparatus 300 further comprises at least one hinge bracket coupled with apparatus 300. In an embodiment, a hinge bracket such as hinge brackets 330 is coupled with a flat, curved or shaped portion of the apparatus 300 in any manner including but not limited to a fastener, epoxy and/or the like.

In an embodiment, apparatus 300 is a hinge for an electronic device.

FIG. 4 is a diagram of an electronic device 401 comprising hinges 400a and 400b in an open configuration according to an example embodiment of the invention. In an embodiment, an electronic device such as electronic device 401 comprises body portions such as body portions 402 and 403.

In an embodiment, electronic device 401 comprises at least one flexible hinge such as hinges 400a and 400b comprising first and second layers such as first and second layers 305 and 310 of FIG. 3. In an embodiment, the hinge is at least one of non-metallic and non-conducting. In an embodiment, first layer comprises an elastomer and said second layer comprises a composite fabric.

In an embodiment, the electronic device 401 further comprises at least one hinge bracket such as hinge brackets 430a and 430b coupled with a hinge such as hinge 400a and a body portion such as body portions 402 and 403 of the electronic device 401. In an embodiment, hinge brackets 431a and 431b are each coupled with hinge 400b and with an internal surface of electronic device 401. A hinge bracket may be coupled with a hinge and a body portion of an electronic device in any manner including but not limited to a fastener, epoxy and/or the like.

Further, in an embodiment, hinge brackets 430a and 430b are each coupled with hinge 400a and with an internal surface of electronic device 401. In an embodiment, hinges 400a and 400b enable body parts 402 and 403 of electronic device 401 to rotate relative to each other about axis 435.

In an embodiment, hinge 400a and/or hinge 400b is apparatus 300 of FIG. 3. In an embodiment, a hinge 400a and/or hinge 400b is apparatus 200 of FIG. 2. In an embodiment, a hinge 400a and/or 400b is apparatus 100 of FIG. 1.

In an embodiment, hinge 400a and/or 400b comprises at least one of a flat, curved and shaped portion.

In an embodiment, the first layer of a hinge such as layer 305 of FIG. 3 comprises an elastomer. In an embodiment, the first layer of a hinge such as hinges 400a and/or 400b comprises a thermoplastic material. In an embodiment, the first layer comprises a thermoset material. In an embodiment, the first layer comprises natural rubber. In an embodiment, the first layer comprises synthetic rubber.

In an embodiment, the second layer such as layer 310 of FIG. 3 of a hinge such as hinges 400a and/or 400b comprises a composite fabric. In an embodiment, the second layer comprises Kevlar®. In an embodiment, the second layer comprises Cordura® fabric.

FIG. 5 is a diagram of a sectional side view of an electronic device 501 comprising a hinge 500 in an open configuration according to an example embodiment of the invention. In an embodiment, an electronic device such as electronic device 501 comprises body portions such as body portions 502 and 503.

In an embodiment, electronic device 501 comprises at least one flexible hinge such as hinge 500 comprising first and second layers such as first and second layers 505 and 510. In an embodiment, the hinge is at least one of non-metallic and non-conducting. In an embodiment, the first layer 505 comprises an elastomer and the second layer 510 comprises a composite fabric.

In an embodiment, the electronic device 501 further comprises at least one hinge bracket such as hinge brackets 531a and 531b coupled with a hinge such as hinge 500 and a body portion such as body portions 502 and 503 of the electronic device 501. In an embodiment, hinge brackets 531a and 531b are each coupled with hinge 500 and with an internal surface of electronic device 501. A hinge bracket may be coupled with a hinge and a body portion of an electronic device in any manner including but not limited to a fastener, epoxy and/or the like.

Further, in an embodiment, hinge brackets 531a and 531b are each coupled with hinge 500 and with an internal surface of electronic device 501. In an embodiment, hinge 500 enables body parts 502 and 503 of electronic device 501 to rotate relative to each other.

In an embodiment, hinge 500 is hinge 400a hinge 400b of FIG. 4. In an embodiment, hinge 500 is apparatus 300 of FIG. 3. In an embodiment, a hinge 500 is apparatus 200 of FIG. 2. In an embodiment, a hinge 500 is apparatus 100 of FIG. 1.

In an embodiment, hinge 500 comprises at least one of a flat, curved and shaped portion. In an embodiment, hinge 500 comprises shaped portion 520. However, the hinge may be shaped in any way appropriate for a particular hinge application.

In an embodiment, the first layer of hinge 500 such as layer 505 comprises an elastomer. In an embodiment, the first layer of a hinge such as hinge 500 comprises a thermoplastic material. In an embodiment, the first layer comprises a thermoset material. In an embodiment, the first layer comprises natural rubber. In an embodiment, the first layer comprises synthetic rubber.

In an embodiment, the second layer such as layer 510 comprises a composite fabric. In an embodiment, the second layer comprises Kevlar®. In an embodiment, the second layer comprises Cordura™ fabric.

Figure 6A:
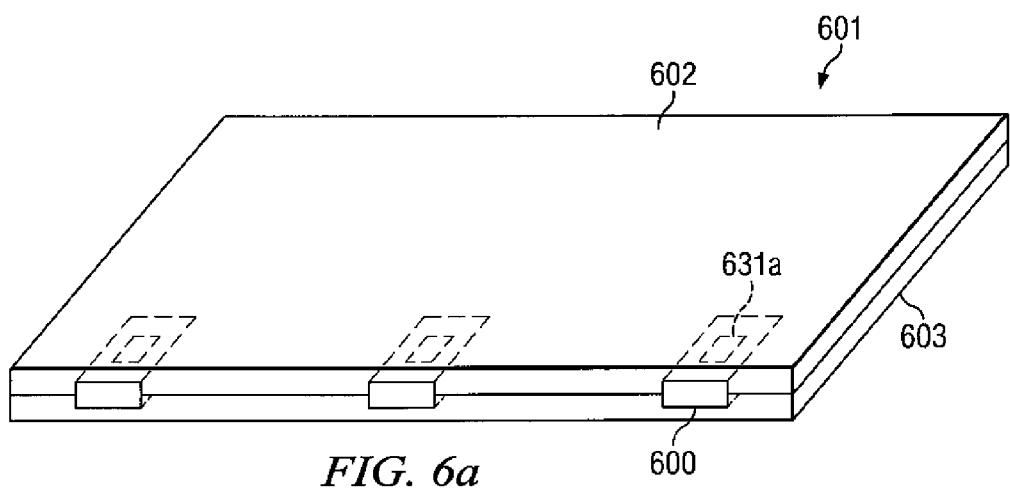
FIG. 6a is a diagram of an electronic device in a closed configuration according to an example embodiment of the invention.
Figure 6B:
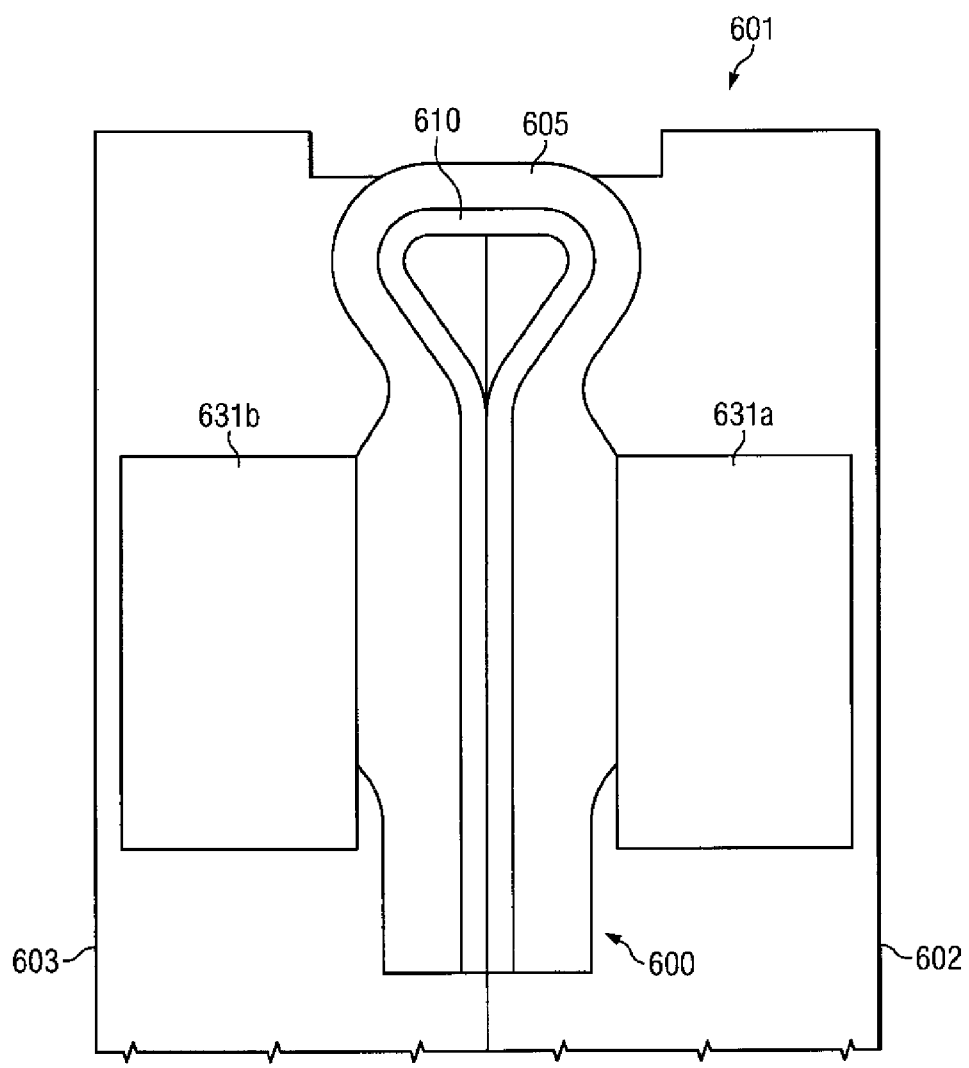
FIG. 6b is a diagram of a sectional side view of the electronic device of FIG. 6a in a closed configuration according to an example embodiment of the invention.

FIG. 6a is a diagram of an electronic device in a closed configuration according to an example embodiment of the invention. FIG. 6b is a diagram of a sectional side view of the electronic device of FIG. 6a in a closed configuration according to an example embodiment of the invention. In an embodiment, an electronic device such as electronic device 601 comprises body portions such as body portions 602 and 603. In an embodiment, electronic device 601 comprises at least one flexible hinge such as hinge 600 comprising first and second layers such as first and second layers 605 and 610. In an embodiment, the hinge is at least one of non-metallic and non-conducting. In an embodiment, the first layer 605 comprises an elastomer and the second layer 610 comprises a composite fabric.

In an embodiment, the electronic device 601 further comprises at least one hinge bracket such as hinge brackets 631a and 631b coupled with a hinge such as hinge 600 and a body portion such as body portions 602 and 603 of the electronic device 601. In an embodiment, hinge brackets 631a and 631b are each coupled with hinge 600 and with an internal surface of electronic device 601. A hinge bracket may be coupled with a hinge and a body portion of an electronic device in any manner including but not limited to a fastener, epoxy and/or the like.

Further, in an embodiment, hinge brackets 631a and 631b are each coupled with hinge 600 and with an internal surface of electronic device 601. In an embodiment, hinge 600 enables body parts 602 and 603 of electronic device 601 to rotate relative to each other.

In an embodiment, hinge 600 is hinge 500 of FIG. 5. In an embodiment, hinge 600 is hinge 400a or hinge 400b of FIG. 4. In an embodiment, hinge 600 is apparatus 300 of FIG. 3. In an embodiment, a hinge 600 is apparatus 200 of FIG. 2. In an embodiment, a hinge 600 is apparatus 100 of FIG. 1.

In an embodiment, the first layer of hinge 600 such as layer 605 comprises an elastomer. In an embodiment, the first layer of a hinge such as hinge 600 comprises a thermoplastic material. In an embodiment, the first layer comprises a thermoset material. In an embodiment, the first layer comprises natural rubber. In an embodiment, the first layer comprises synthetic rubber.

In an embodiment, the second layer such as layer 610 comprises a composite fabric. In an embodiment, the second layer comprises Kevlar®. In an embodiment, the second layer comprises Cordura® fabric.

Figure 7:
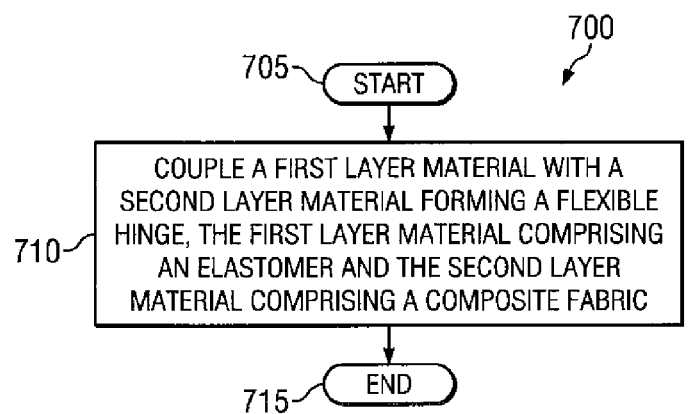
FIG. 7 is a flow diagram of a method for coupling a first layer material with a second layer material forming a flexible hinge.

FIG. 7 is a flow diagram 700 of a method for coupling a first layer material with a second layer material forming a flexible hinge. In an embodiment, the hinge is at least one of non-metallic and non-conducting. At 705, the method begins. At 710, a first layer material such as first layer 105 of FIG. 1 is coupled with a second layer material such as second layer 110 forming flexible hinge such as hinge 100 of FIG. 1 or hinge 200 of FIG. 2.

In an embodiment, the first layer material comprises an elastomer. In an embodiment, the first layer material comprises a thermoplastic material. In an embodiment, the first layer material comprises a thermoset material. In an embodiment, the first layer material comprises natural rubber. In an embodiment, the first layer material comprises synthetic rubber.

In an embodiment, the second layer material comprises a composite fabric. In an embodiment, the second layer material comprises Kevlar®. In an embodiment, the second layer material comprises a Cordura® fabric.

First layer material may be coupled with second layer material using any manner including but not limited to applying an adhesive such an en epoxy between the first layer material and second layer material to form a flexible hinge. The method ends at 715.

Without in any way limiting the scope, interpretation, or application of the claims appearing below, a technical effect of one or more of the example embodiments disclosed herein is to provide a flexible hinge for an electronic device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a flexible hinge comprising first and second layers, said first layer comprising an elastomer and said second layer comprising a composite fabric;
   at least one bracket interface portion on said first layer; and
   at least one hinge bracket coupled with said at least one bracket interface portion.

2. An apparatus according to claim 1, wherein said first layer comprises a thermoplastic material.

3. An apparatus according to claim 1, wherein said first layer comprises a thermoset material.

4. An apparatus according to claim 1, wherein said first layer comprises natural rubber.

5. An apparatus according to claim 1, wherein said first layer comprises synthetic rubber.

6. An apparatus according to claim 1, wherein said second layer comprises Kevlar.

7. An apparatus according to claim 1, wherein said second layer comprises Cordura fabric.

8. An apparatus according to claim 1, wherein said apparatus comprises at least one of a flat, curved and shaped portion.

9. An apparatus according to claim 1, further comprising an electrical coupler.

10. An electronic device, comprising:
    at least one flexible hinge comprising first and second layers, said first layer comprising an elastomer and said second layer comprising a composite fabric;
    an electrical coupler disposed on at least one of said first and second layers; and
    at least one hinge bracket coupled with said hinge and a body portion of said electronic device.

11. An electronic device according to claim 10, wherein said first layer comprises a thermoplastic material.

12. An electronic device according to claim 10, wherein said first layer comprises a thermoset material.

13. An electronic device according to claim 10, wherein said first layer comprises natural rubber.

14. An electronic device according to claim 10, wherein said first layer comprises synthetic rubber.

15. An electronic device according to claim 10, wherein said second layer comprises Kevlar.

16. An electronic device according to claim 10, wherein said second layer comprises Cordura fabric.

* * * * *